(12) United States Patent
Brix et al.

(10) Patent No.: US 12,124,227 B2
(45) Date of Patent: Oct. 22, 2024

(54) METHOD FOR TEACHING THE CONTROL FUNCTION OF HYDROSTATIC MOTORS WHEN IN DRIVE MODE

(71) Applicant: Robert Bosch GmbH, Stuttgart (DE)

(72) Inventors: Norman Brix, Leipheim (DE);
Matthias Mueller, Langenau (DE);
Steffen Mutschler, Neu-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 548 days.

(21) Appl. No.: 17/336,649

(22) Filed: Jun. 2, 2021

(65) Prior Publication Data

US 2021/0382444 A1    Dec. 9, 2021

(30) Foreign Application Priority Data

Jun. 3, 2020   (DE) .................. 10 2020 206 874.7

(51) Int. Cl.
| | | |
|---|---|---|
| *G05B 13/02* | (2006.01) | |
| *F03C 1/40* | (2006.01) | |
| *F04B 1/295* | (2020.01) | |
| *F04B 1/324* | (2020.01) | |
| *F16H 61/47* | (2010.01) | |

(52) U.S. Cl.
CPC ........ *G05B 13/0265* (2013.01); *F03C 1/0686* (2013.01); *F04B 1/295* (2013.01); *F04B 1/324* (2013.01); *F16H 61/47* (2013.01)

(58) Field of Classification Search
None
See application file for complete search history.

(56) References Cited

U.S. PATENT DOCUMENTS

| | | | |
|---|---|---|---|
| 5,266,756 A | 11/1993 | Hatano | |
| 6,375,433 B1 | 4/2002 | Du et al. | |
| 6,442,934 B1 * | 9/2002 | Okuda | F16H 61/468 |
| | | | 60/451 |
| 9,605,756 B1 * | 3/2017 | Maiyur | E02F 9/2296 |
| 2004/0261407 A1 | 12/2004 | Du | |

(Continued)

FOREIGN PATENT DOCUMENTS

| | | |
|---|---|---|
| DE | 10 2013 217 708 A1 | 3/2015 |
| EP | 3 382 475 A2 | 10/2018 |

*Primary Examiner* — Kenneth M Lo
*Assistant Examiner* — Istiaque Ahmed
(74) *Attorney, Agent, or Firm* — Maginot, Moore & Beck LLP

(57) ABSTRACT

A method teaches a control function, preferably a characteristic curve, of a hydrostatic motor of a traction drive of a work machine when in drive mode. The traction drive is provided with the hydrostatic motor and a hydrostatic pump, which is hydraulically connected to the hydrostatic motor. The method includes setting a pivot angle of the hydrostatic motor while taking into account a desired velocity of the work machine when in the drive mode, and checking whether predefined conditions are met. If the predefined conditions are met and a current velocity differs from the desired velocity, the method includes correcting the control function of the hydrostatic motor by taking into account a difference between the desired velocity and the current velocity. At least one value of the corrected control function of the hydrostatic motor is taught during the correcting.

20 Claims, 4 Drawing Sheets

(56) References Cited

U.S. PATENT DOCUMENTS

| | | | |
|---|---|---|---|
| 2006/0150767 A1* | 7/2006 | Shah | F16H 61/40 74/730.1 |
| 2008/0262688 A1* | 10/2008 | Behm | B60T 10/04 60/426 |
| 2009/0139792 A1 | 6/2009 | Chisholm et al. | |
| 2012/0152642 A1* | 6/2012 | Takahashi | F16H 61/421 180/307 |
| 2016/0169304 A1* | 6/2016 | Kuros | F16D 48/10 701/68 |
| 2016/0341193 A1 | 11/2016 | Du et al. | |
| 2019/0226579 A1* | 7/2019 | Zhang | F16H 61/421 |
| 2022/0196147 A1* | 6/2022 | Gono | F04B 1/295 |
| 2022/0298743 A1* | 9/2022 | Zhdanov | E02F 3/439 |
| 2023/0055738 A1* | 2/2023 | Nakano | B60K 31/00 |

* cited by examiner

METHOD FOR TEACHING THE CONTROL FUNCTION OF HYDROSTATIC MOTORS WHEN IN DRIVE MODE

This application claims priority under 35 U.S.C. § 119 to patent application no. DE 10 2020 206 874.7, filed on Jun. 3, 2020 in Germany, the disclosure of which is incorporated herein by reference in its entirety.

The disclosure relates to a method for teaching a control function, preferably a characteristic curve, of a hydrostatic motor of a traction drive of a work machine when in drive mode.

BACKGROUND

Hydrostatic traction drives for mobile work machines, in which a hydraulic pump and one or a plurality of hydraulic motors are connected to one another in a closed hydraulic circuit, are known. The hydraulic pump is driven by an internal combustion engine, for example a diesel engine, and the hydraulic motors ultimately drive the mobile work machine, for example by way of a respective road wheel.

The hydraulic pump of traction drives of this type is often adjustable in terms of the conveying volume of said hydraulic pump. For example, the volumetric flow conveyed by the hydraulic pump in the closed circuit at a constant rotating speed of the internal combustion engine can thus be varied and a drive output rotating speed of the hydraulic motors, or of the road wheels, respectively, thus a travel velocity of the mobile work machine, can thus be adjusted.

It is furthermore known that the hydraulic motor or the hydraulic motors is/are adjustable in terms of the displacement thereof. When starting up the respective mobile work machine, it is thus possible initially for the conveying volume of the hydraulic pump, proceeding from zero, to be increased to the maximum value, so as to then, proceeding from the maximum, reduce the displacement of the hydraulic motors for more rapid travel, for example. The drive output rotating speed is increased at a consistent volumetric flow by way of this reduction.

The disclosure relates to the adjustment, or the closed-loop control, of the at least one hydraulic motor.

Hydraulic motors with an electroproportional adjustment of the displacement volume are used inter alia in traction drives of construction machinery. The control function, or the characteristic curve, is important in order to achieve defined transmission ratios of hydrostatic transmissions for controlling vehicle velocities. The adjustment required for achieving the maximum velocity is particularly relevant in the present disclosure.

There are various methods which can be used for managing the tolerances in the characteristic curve of the motors.

The hardware electroproportional controller of the motor can be set so as to be project-specific at the production line of the motor. The adjustment point here is chosen to match the maximum velocity of the work machine. The disadvantage of such a solution is that the setting has to be performed using a project-specific procedure, this causing high costs and limited accuracy. Moreover, the vehicle-specific tolerances are not taken into account.

Alternatively, the work machine at the end of the vehicle production line can be "jacked up" with the road wheels freely rotating, and the pivot angle of the motor that is required for the maximum velocity can be identified with the aid of a rotating speed sensor system and an automated calibration function. Alternatively, the minimum current of the electroproportional adjustment can be manually set at each work machine in that a test drive is carried out at maximum velocity. The disadvantage of such solutions is that the work machine has to be lifted for this purpose, this causing additional costs at the end of the assembly line.

Alternatively, the characteristic curve of current vs. motor volume can be determined at the end of the line of the components. The calibration data generated therefrom is later uploaded to the respective control apparatus during vehicle production. The disadvantage is the creation of complexity/costs for determining the data and transferring the latter to the vehicle controller on the assembly line. Moreover, the vehicle-specific tolerances are not taken into account here.

Alternatively, a terminal velocity controller which, based on the rotating speed, controls erroneous motor adjustments in the drive software could be used. The disadvantage is however that the behavior of the controller always leads to the maximum velocity initially being exceeded.

In contrast, the disclosure is based on the object of providing a method which will overcome the disadvantages listed above.

SUMMARY

Provided according to one embodiment of the present disclosure is a method for teaching a control function, preferably a characteristic curve, of a hydrostatic motor of a traction drive of a work machine when in drive mode, wherein the traction drive is provided with the hydrostatic motor and a hydrostatic pump which is hydraulically connected to the hydrostatic motor, wherein the method comprises the following steps:
a. setting a pivot angle of the hydrostatic motor while taking into account a desired velocity of the work machine when in drive mode;
b. checking whether predefined conditions are met;
c. if the predefined conditions are met and the current velocity differ from the desired velocity, correcting the control function of the hydrostatic motor by taking into account the difference between the desired velocity and the current velocity;

wherein at least one value of the corrected control function of the hydrostatic motor is taught in step c. The predefined conditions, as will be explained in the course of the description, depend on the different teaching targets. The predefined conditions can otherwise not be defined in more detail without the scope of protection of the claims being excessively restricted. "Differs" means that the difference between the current velocity and the desired velocity is less than a predefined Δ, wherein the Δ is less than ±1 km/h, preferably less than ±0.7 km/h, more preferably less than ±0.5 km/h.

Provided according to one further embodiment of the present disclosure is a method, wherein the pivot angle which is set in step a. is determined by means of a volumetric flow balance, wherein one of the mentioned predefined conditions in step b. preferably is that the current pivot angle corresponds to the computed pivot angle. "The current pivot angle corresponds to the computed pivot angle" means that the difference between the two is less than a predefined Δ, wherein the Δ is less than ±0.5°, preferably less than ±0.4°, more preferably less than ±0.3°.

Provided according to one further embodiment of the present disclosure is a method wherein the mentioned control function of the hydrostatic motor represents the interdependency between the current which is used for controlling the pivot angle of the motor and a volumetric flow of the motor.

Provided according to one further embodiment of the present disclosure is a method wherein the current which is used for controlling the pivot angle of the motor, in step c. is increased or decreased until the difference between the velocity of the work machine and the desired velocity is less than a predefined value.

Provided according to one further embodiment of the present disclosure is a method wherein in step c. the current which is used for controlling the pivot angle of the motor is increased or decreased in steps.

Provided according to one further embodiment of the present disclosure is a method wherein the mentioned value of the control function of the hydrostatic motor is a minimum current which is able to be set in the control function.

Provided according to one further embodiment of the present disclosure is a method wherein the mentioned value of the control function of the hydrostatic motor is a maximum current which is able to be set in the control function.

Provided according to one further embodiment of the present disclosure is a method wherein one of the mentioned predefined conditions is that a pressure measured in the system does not exceed a limit value.

Provided according to one further embodiment of the present disclosure is a method wherein one of the mentioned predefined conditions is that the desired velocity is at least 90% of the maximum velocity of the work machine.

Provided according to one further embodiment of the present disclosure is a method wherein the hydrostatic pump is driven by a drive motor, wherein one of the mentioned predefined conditions preferably is that the velocity of the drive motor is higher than a predefined velocity which is required for the maximum velocity of the work machine according to a predefined adjustment angle of the hydrostatic motor.

BRIEF DESCRIPTION OF THE DRAWINGS

The present disclosure will be described with reference to the appended figures, wherein identical reference signs relate to identical parts and/or to similar parts and/or to equivalent parts of the system. In the figures.

DETAILED DESCRIPTION

The present disclosure will be described hereunder with reference to specific embodiments as are shown in the appended figures. Nevertheless, the present disclosure is not limited to the particular embodiments which are described in the detailed description hereunder and shown in the figures; rather, the embodiments described merely visualize some aspects of the present disclosure, the scope of protection of the latter being defined by the claims.

Further modifications and variations of the present disclosure are obvious to the person skilled in the art. The present description thus comprises all modifications and/or variations of the present disclosure, the scope of protection of the latter being defined by the claims.

Figure 1:
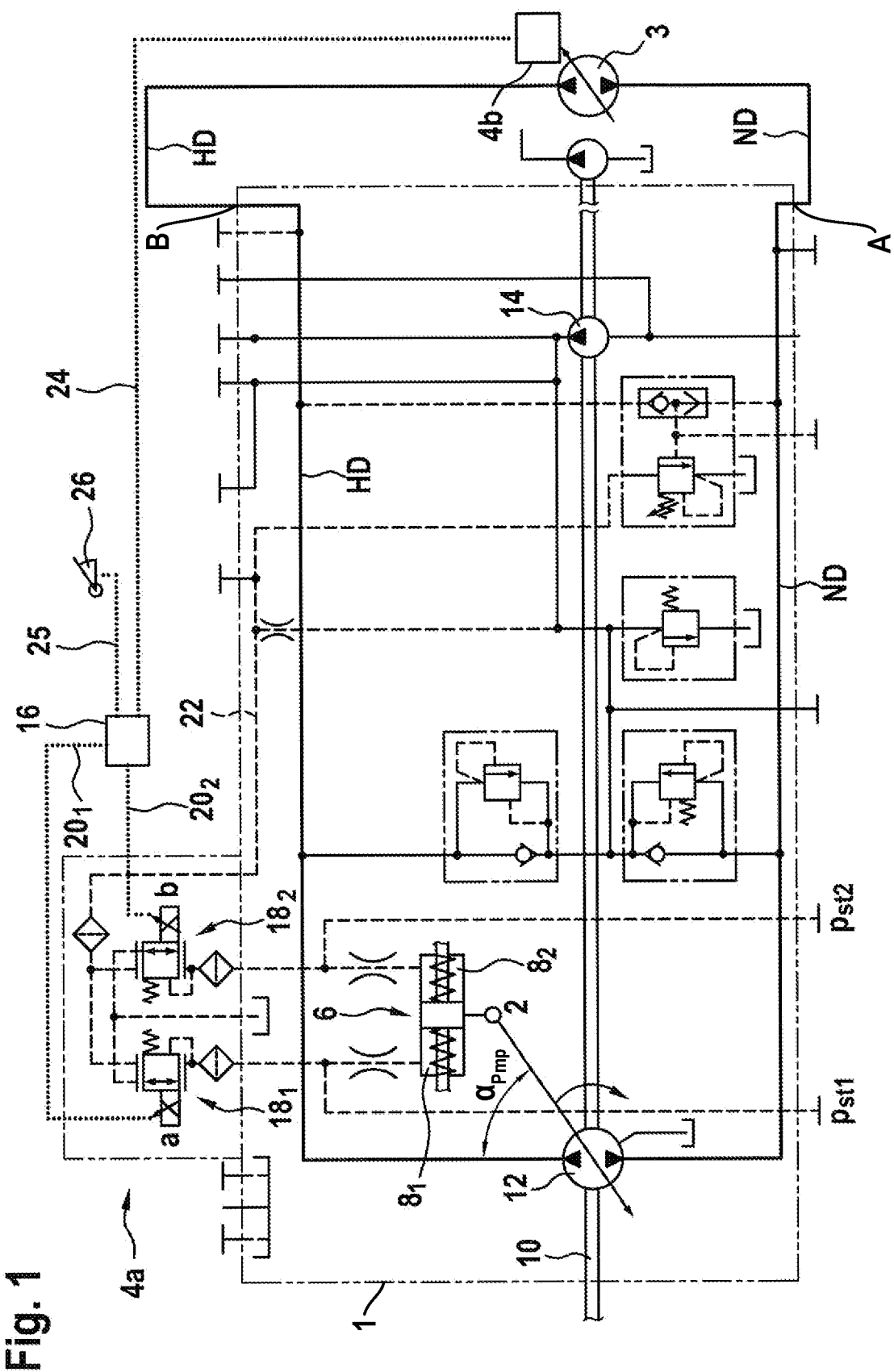
FIG. 1 schematically shows a diagram of a traction drive according to the prior art.

FIG. 1 shows a diagram in which the method according to the disclosure is carried out. Only those components which are relevant to the disclosure are described.

The traction drive has an axial piston pump 1, two working ports A, B being formed on the housing of said axial piston pump 1. A hydraulic motor 3 is fluidically connected to the axial piston pump 1 by way of the working ports A, B and by way of working lines of a closed circuit. A road wheel (not shown) is coupled in a rotationally fixed manner to an output shaft of the hydraulic motor 3. A traction drive for a mobile work machine (not shown in more detail) is thus formed.

The axial piston pump 1 is embodied with a swash plate 2, the pump pivot angle $\alpha_{Pmp}$ of the latter being able to be set by way of an adjustment unit 4a. A dual-action positioning cylinder 6 which has a first actuating pressure chamber $8_1$ and a second, counter-acting, actuating pressure chamber $8_2$ serves for this purpose.

A first control pressure in the first actuating pressure chamber $8_1$ acts in the direction of enlarging the pivot angle $\alpha_{Pmp}$ and thus in the direction of enlarging the pump conveying volume $V_P$. Counteracting this is a further actuating pressure which in the second actuating pressure chamber $8_2$ acts in the direction of reducing the pivot angle $\alpha_{Pmp}$ and thus in the direction of reducing the pump conveying volume $V_P$. An actuating pressure difference which, according to the definition, always acts in the direction of enlarging the pump pivot angle $\alpha_{Pmp}$, or the pump conveying volume $V_P$, respectively, can thus be defined.

The drive mechanism 12 of the axial piston pump 1, and moreover also a feed pump 14, are driven by way of a drive input shaft 10 of the axial piston pump 1. The drive input shaft 10 is driven by a diesel engine (drive motor), not shown here, the crankshaft of said diesel engine rotating at a rotating speed. The drive input shaft 10 therefore rotates at the same pump rotating speed or at a proportionally modified pump rotating speed.

The pump rotating speed interacts with the actuating pressure difference in the direction of enlarging the pump pivot angle $\alpha_{Pmp}$. More specifically, an increase in the pump rotating speed acts in this way.

When the axial piston pump 1 shown, by way of the working ports A, B thereof, supplies the hydraulic motor 3, it is assumed that the working port B is the high-pressure port when the mobile work machine is in forward travel mode. Accordingly, the working line which is connected to the working port B is identified as high pressure HD, while the other working line is identified as low pressure ND. The high pressure HD acts in the direction of reducing the pump pivot angle $\alpha_{Pmp}$. These mentioned effects of the actuating pressure difference, the pump rotating speed and the high pressure HD are measured. The above-mentioned effects thereof on the pump pivot angle $\alpha_{Pmp}$ are stored as formulas and/or as characteristic maps or characteristic curves, respectively, in an electronic control unit 16 of the road wheel drive assembly according to the disclosure. Operating points of the axial piston machine 1 can thus be actuated without any feedback in the context of a closed-loop control circuit being required to this end.

The two actuating pressures are controlled by way of two pressure reduction valves $18_1$, $18_2$. Each of these has a solenoid a, b which is connected to the electronic control unit 16 by way of a respective electrical line 20₁, 20₂. The two pressure reduction valves 18₁, 18₂ are conceived in such a manner that the respective actuating pressure is proportional to the respective amperage. The two pressure reduction valves 18₁, 18₂ at the input side are supplied by the feed pump 14 by way of a feed pressure line 22.

An operating element 26 for transmitting the command of the driver is connected to the control unit 16 by way of an electrical line 25, wherein the operating element 26 is preferably designed as a drive mode pedal.

The already mentioned hydraulic motor 3 as a secondary machine is connected to the two working lines HD, ND of the closed circuit. A motor displacement volume $V_m$ is adjustable by way of an electric adjustment unit 4b. The latter is connected to the control unit 16 by way of an electrical line 24 and is controlled in an open loop and closed loop in the manner according to the disclosure as described hereunder.

Hydraulic motors with electroproportional adjustment of the displacement volume are used inter alia in traction drives of construction machinery. The control function, or the characteristic curve, respectively, is important for achieving defined transmission ratios of hydrostatic transmissions for controlling vehicle velocities. The adjustment required for reaching the maximum velocity is particularly relevant in an exemplary embodiment of the present disclosure.

When starting up and while the velocity of the mobile work machine increases, the velocity corresponding to the motor rotating speed, the pivot angle $\alpha_{Pmp}$ of the pump 12 is first controlled such that the velocity of the work machine is increased. Consequently, the controlling action is carried out by the motor 3, in particular by reducing the pivot angle $\alpha_{Mot}$ of the motor 3 so that the velocity of the work machine can be successfully increased.

The control unit 16 is configured such that an item of information is received by the operating element 26 by way of the electrical line 25 so that the command of the driver is determined. The command of the driver is typically an ideal velocity of the work machine which the driver wants to achieve.

The pivot angle $\alpha_{Mot}$ of the motor 3 is first computed in the control unit 16. The pivot angle $\alpha_{Mot}$ of the motor 3 is in particular computed by way of a volumetric flow balance according to the formula hereunder:

$$\alpha_{Mot} = \frac{V_{GP}\alpha_{Pmp}n_{Pmp} - Q_{leak}}{V_{GM}n_{Mot}} \quad \text{(Formula 1)}$$

$V_{GP}$: maximum conveying volume of the pump 12
$V_{GM}$: maximum displacement volume of the motor 3;
$\alpha_{Pmp}$: standardized degree of adjustment of the pump 12;
$\alpha_{Mot}$: standardized degree of adjustment of the motor 3;
$n_{Pmp}$: rotating speed of the pump;
$n_{Mot}$: rotating speed of the motor;
$Q_{leak}$: leakage.

The volumetric flow of leakage $Q_{leak}$, which is lost by virtue of the leakage, is determined by the method which is described in DE 10 2013 217 708.

Alternatively, an implemented method can be used:

$$Q_{Leak} = k_{off} + \Delta p \ kl$$

$k_{off}$ offset factor of the leakage
$k_l$ leakage factor as a function of the pressure A control function, preferably a characteristic curve, which while taking into account the desired pivot angle $\alpha_{Mot}$ of the motor 3, that is to say the desired volumetric flow of the motor 3, computes a current value which is sent to the adjustment unit 4b so that the velocity desired by the driver can be achieved, is stored in the control unit 16.

However, it is important that this control function is very accurate so that the desired velocity can actually be achieved. It is in particular also very important that the control function can be updated over time (for example after a predefined number of operating hours) so that a change in the conditions, inter alia when service life drift arises, can be taken into account.

It is therefore an object of this disclosure to provide a method which solves these sets of issues. A method for teaching a control function, in particular a characteristic curve and/or a formula and/or a characteristic map, of a hydrostatic motor of a traction drive of a work machine when in the drive mode is in particular provided by this disclosure.

Figure 2:
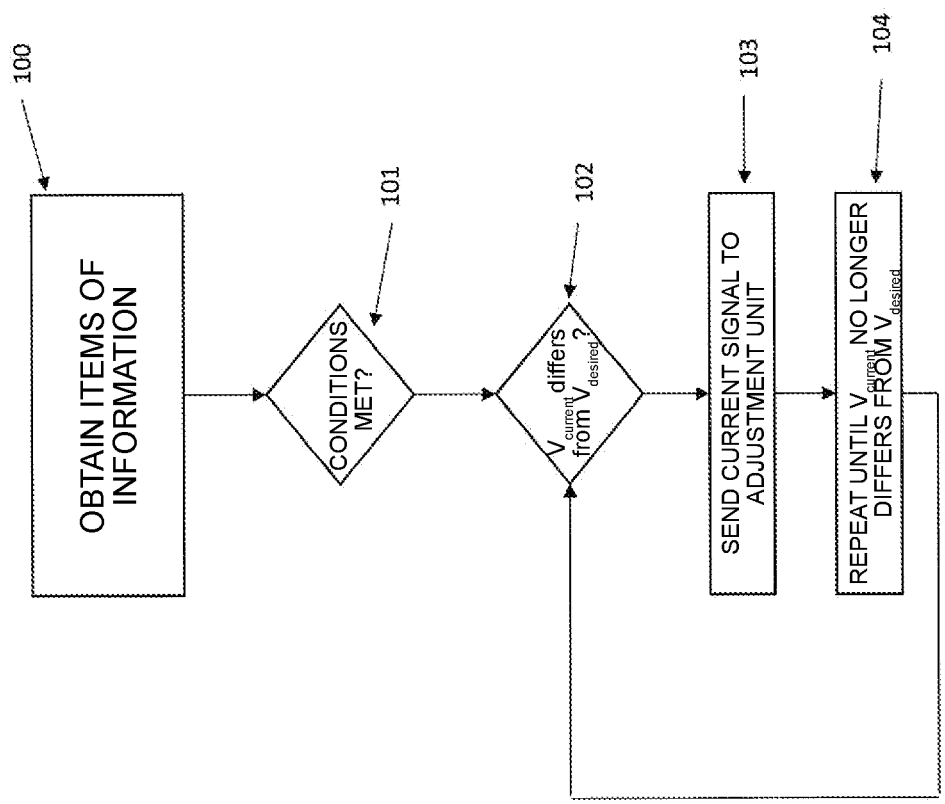
FIG. 2 schematically shows a diagram of the teaching method according to one embodiment of the present disclosure.

The teaching method will be described in general terms for different embodiments with reference to FIG. 2.

In step 100, different items of information such as, for example, the desired velocity, the current velocity, the maximum velocity (which is permitted), the velocity of the diesel engine (drive motor) which drives the drive input shaft 10, are obtained at the control unit 16.

The teaching will only be performed in the case in which the items of information obtained meet predefined conditions. It is therefore checked in step 101 whether the predefined conditions are met. If the predefined conditions are met, the method for teaching will continue with step 102. The mentioned "predefined conditions" will be presented in detail with reference to different embodiments in the next paragraphs.

In step 102, it is checked whether the current velocity differs from the desired velocity. If the predefined conditions are met and the current velocity also differs from the desired velocity, the control function of the hydrostatic motor is corrected by taking into account the difference between the desired velocity and the current velocity.

In the present disclosure, the wording "differs from the desired velocity" means that the difference between the current velocity and the desired velocity is less than a predefined Δ, wherein the Δ can be, for example, equal to ±1 km/h.

In step 103, a current signal which has been computed by means of the corrected control function while taking into account the desired volumetric flow of the motor 3 is sent to the adjustment unit 4b so that a new pivot angle $\alpha_{Mot}$ of the motor 3 is set.

The method will then continue again in a cycled manner with above-described step 102 until the current velocity no longer differs from the desired velocity (step 104).

It is obvious that the method which has been described with reference to FIG. 2 can be used for different embodiments. The present disclosure is therefore not limited to a specific embodiment.

In order for this applicability to be substantiated, the method for teaching in detail for different embodiments will be briefly presented in the next paragraphs.

A method for teaching a characteristic curve of a hydrostatic motor 3 of a traction drive, according to a particular embodiment of the present disclosure, will be described in the following paragraphs with reference to FIG. 3.

In this example, there are various conditions which should be met in step 101 so as to commence with the teaching method. The conditions may be the following:

the current pivot angle corresponds to the computed pivot angle; and/or the pressure which is measured in the system does not exceed a limit value; and/or the desired velocity is less than the maximum permissible velocity; and/or the desired velocity is more than 80% of the maximum permissible velocity, said desired velocity preferably being more than 85% of the maximum permissible velocity, said desire velocity even more preferably being more than 90% of the maximum permissible velocity; and/or the velocity of the drive motor is more than a predefined velocity which is required for the maximum velocity of the work machine according to a predefined adjustment angle of the hydrostatic motor; and/or the control which avoids overloading of the drive motor when overloading is detected in that the hydrostatic transmission ratio is reduced is not activated.

It is pointed out that the present disclosure includes all combinations of the above-mentioned conditions.

Figure 3:
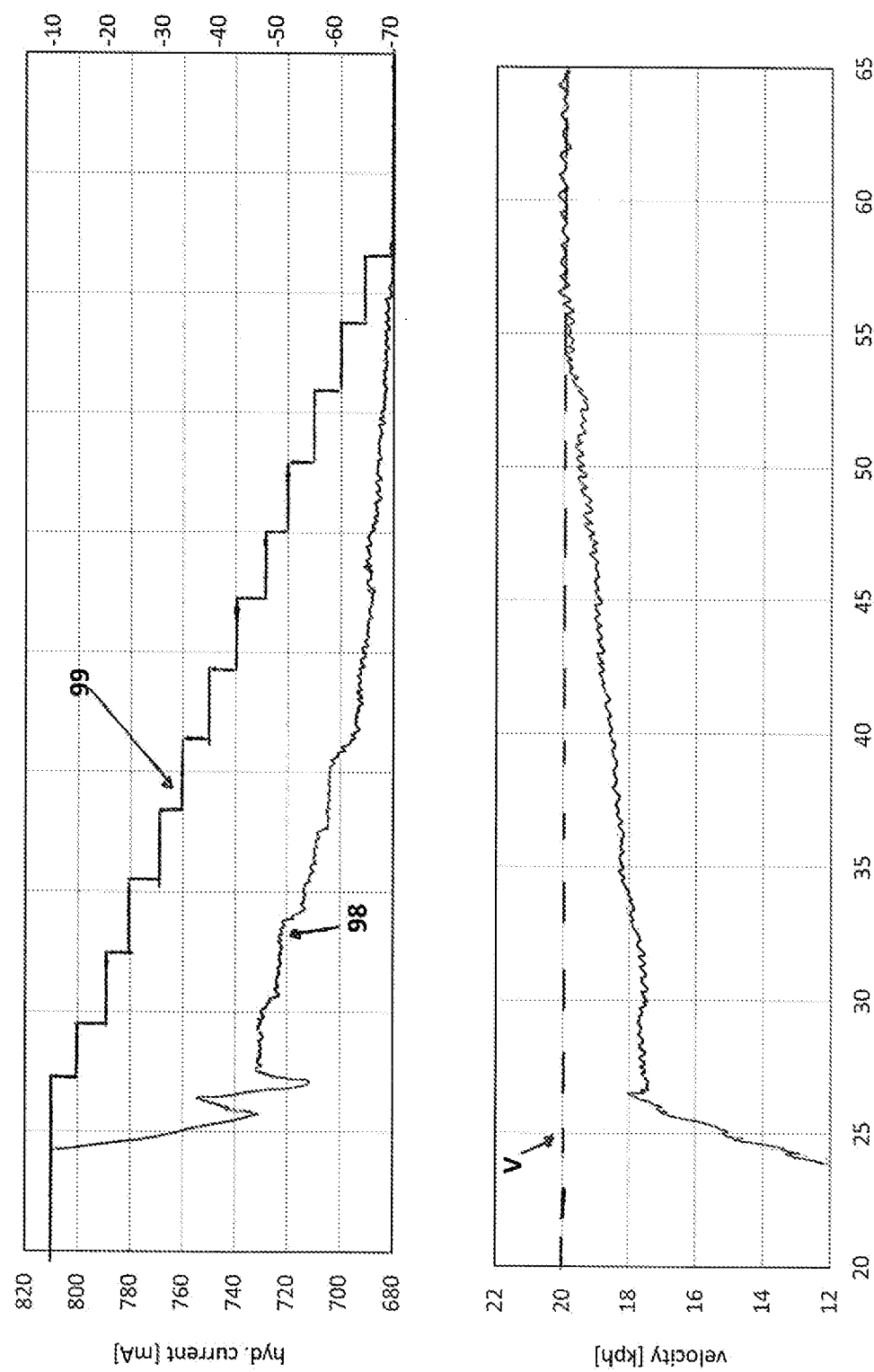
FIG. 3 schematically shows a temporal illustration of different parameters during the teaching method according to one embodiment of the present disclosure.
Figure 4:
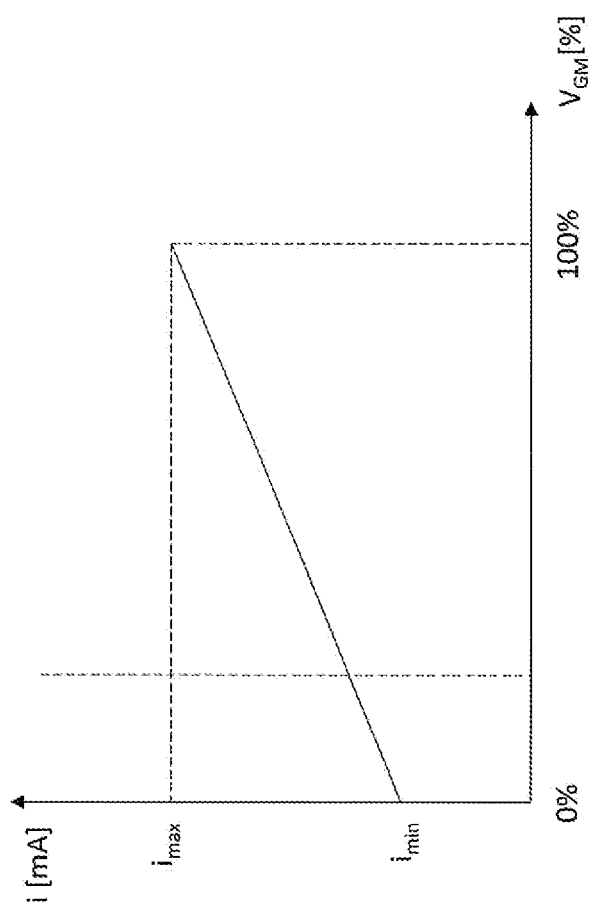
FIG. 4 schematically shows an example of a characteristic curve according to one embodiment of the present disclosure.

An example of a characteristic curve which is corrected by the method illustrated in FIG. 3 is illustrated in FIG. 4. The motor displacement volume (in %) is illustrated on the X-axis, and the current (motor actuation current) which is sent to the adjustment unit 4b so that a desired pivot angle $\alpha_{Mot}$ of the motor 3 is set is illustrated on the Y-axis. The correlation between the motor actuation current and the motor displacement volume is preferably proportional, or the characteristic curve is preferably linear, respectively.

The temporal profile of the motor displacement volume 98 and the correction 99 of $i_{min}$ illustrated in FIG. 4 is illustrated in the upper portion of FIG. 3, whereby $i_{min}$ is the minimum value which can be set in the linear characteristic curve. In contrast, the temporal profile of the current velocity is illustrated in the lower portion of FIG. 3.

This method is used for achieving the desired velocity. As is illustrated in FIG. 3, $i_{min}$ is decreased in steps in each step 103, and the characteristic curve is thus corrected in each cycle until the current velocity no longer differs from the desired velocity, as is illustrated in the lower portion of FIG. 3. As a consequence of this correction, the motor actuation current 98 will slowly increase because the motor actuation current is computed by way of each new corrected characteristic curve.

As an alternative to the exemplary embodiment which has been illustrated in FIG. 3, which is used for correcting the control function for achieving the maximum velocity, this teaching function can be used for solving various problems.

In another exemplary embodiment (not illustrated) the current which is used for the maximum pivot angle $\alpha_{Mot}$ of the motor 3 is taught. In this case, it is no longer $i_{min}$ but $i_{max}$ that is corrected in steps.

In another exemplary embodiment (not illustrated) the problem of adjusting the hydraulic motor 3, which adjustment can change over the service life, can be solved. The problem lies in that the initially obtained characteristic curve is no longer suitable as a result of the service life. When the minimum current $I_{min}$ is only taught so as to decrease (as is the case in the example illustrated in FIG. 3), the service life drift, depending on the direction, can lead to a lower minimum current $I_{min}$, which causes excessively fast travel. In order for this problem to be solved, it can be desirable after a certain time to teach the minimum current $I_{min}$ so as to increase, in order for the maximum velocity to be limited.

There are different conditions which have to be met in step 101 also in this example, so as to commence with the teaching method. The conditions may be the following:

the current velocity is more than the maximum permissible velocity; and/or the "closed loop" controller for a controlled velocity limit is active; and/or the control system which avoids the excessive rotating speed of the drive motor in that the control system increases the hydrostatic transmission ratio is activated.

While the present disclosure has been described with reference to the above-described embodiments, it is obvious to the person skilled in the art that it is possible to implement various modifications, variations and improvements of the present disclosure in light of the above-described teaching and within the scope of the appended claims, without deviating from the scope of protection of the disclosure.

For this reason, even when the correlation between the motor actuation current and the motor displacement volume in the exemplary embodiments is linear, the correlation may also be non-linear, and parameters which are an alternative to $i_{min}$ and $i_{max}$ may be corrected (such as, for example, the parameters of a quadratic function).

Moreover, those areas which person skilled in the art would be familiar with are not described here so as to not unnecessarily obscure the described disclosure.

Accordingly, the disclosure is not intended to be limited by the specific embodiments visualized but only by the scope of protection of the appended claims.

What is claimed is:

1. A method for teaching a control function of a hydrostatic motor of a traction drive of a work machine when in a drive mode, the traction drive provided with the hydrostatic motor and a hydrostatic pump that is hydraulically connected to the hydrostatic motor, the method comprising:
    using a control function, setting a pivot angle of the hydrostatic motor based on a desired velocity of the work machine when in the drive mode;
    checking whether predefined conditions are met;
    when (i) the predefined conditions are met, and (ii) a current velocity differs from the desired velocity, correcting the control function of the hydrostatic motor according to a difference between the desired velocity and the current velocity, the correcting of the control function including learning at least one value of the corrected control function of the hydrostatic motor; and
    determining the pivot angle based on a volumetric flow balance,
    wherein one of the predefined conditions is that a current pivot angle corresponds to the pivot angle set using the control function.

2. The method according to claim 1, wherein the control function of the hydrostatic motor represents an interdependency between a current used for controlling the pivot angle and a volumetric flow of the hydrostatic motor.

3. The method according to claim 2, wherein correcting the control function comprises:
    increasing or decreasing the current used for controlling the pivot angle indirectly by correcting the control function until the difference between the desired velocity and the current velocity is less than a predefined value.

4. The method according to claim 3, wherein correcting the control function further comprises:
    increasing or decreasing the current used for controlling the pivot angle in steps.

5. The method according to claim 2, wherein the control function of the hydrostatic motor includes at least one of a characteristic curve, a formula, and a characteristic map that defines the interdependency between the current used for controlling the pivot angle and the volumetric flow of the hydrostatic motor.

6. The method according to claim 2, wherein the at least one value of the corrected control function is a minimum current that is able to be set in the control function.

7. The method according to claim 2, wherein the at least one value of the corrected control function is a maximum current that is able to be set in the control function.

8. A method for teaching a control function of a hydrostatic motor of a traction drive of a work machine when in a drive mode, the traction drive provided with the hydrostatic motor and a hydrostatic pump that is hydraulically connected to the hydrostatic motor, the method comprising:
using a control function, setting a pivot angle of the hydrostatic motor based on a desired velocity of the work machine when in the drive mode;
checking whether predefined conditions are met; and
when (i) the predefined conditions are met, and (ii) a current velocity differs from the desired velocity, correcting the control function of the hydrostatic motor according to a difference between the desired velocity and the current velocity, the correcting of the control function including learning at least one value of the corrected control function of the hydrostatic motor,
wherein one of the predefined conditions is that a pressure measured in a system including the work machine does not exceed a limit value.

9. The method according to claim 8, wherein the control function of the hydrostatic motor represents an interdependency between a current used for controlling the pivot angle and a volumetric flow of the hydrostatic motor.

10. The method according to claim 9, wherein correcting the control function comprises:
increasing or decreasing the current used for controlling the pivot angle indirectly by correcting the control function until the difference between the desired velocity and the current velocity is less than a predefined value.

11. The method according to claim 9, wherein the control function of the hydrostatic motor includes at least one of a characteristic curve, a formula, and a characteristic map that defines the interdependency between the current used for controlling the pivot angle and the volumetric flow of the hydrostatic motor.

12. The method according to claim 8, wherein the at least one value of the corrected control function is a minimum current that is able to be set in the control function or a maximum current that is able to be set in the control function.

13. A method for teaching a control function of a hydrostatic motor of a traction drive of a work machine when in a drive mode, the traction drive provided with the hydrostatic motor and a hydrostatic pump that is hydraulically connected to the hydrostatic motor, the method comprising:
using a control function, setting a pivot angle of the hydrostatic motor based on a desired velocity of the work machine when in the drive mode;
checking whether predefined conditions are met; and
when (i) the predefined conditions are met, and (ii) a current velocity differs from the desired velocity, correcting the control function of the hydrostatic motor according to a difference between the desired velocity and the current velocity, the correcting of the control function including learning at least one value of the corrected control function of the hydrostatic motor,
wherein one of the predefined conditions is that the desired velocity is at least 90% of a maximum velocity of the work machine.

14. The method according to claim 13, wherein the control function of the hydrostatic motor represents an interdependency between a current used for controlling the pivot angle and a volumetric flow of the hydrostatic motor.

15. The method according to claim 14, wherein correcting the control function comprises:
increasing or decreasing the current used for controlling the pivot angle indirectly by correcting the control function until the difference between the desired velocity and the current velocity is less than a predefined value.

16. The method according to claim 14, wherein the control function of the hydrostatic motor includes at least one of a characteristic curve, a formula, and a characteristic map that defines the interdependency between the current used for controlling the pivot angle and the volumetric flow of the hydrostatic motor.

17. A method further for teaching a control function of a hydrostatic motor of a traction drive of a work machine when in a drive mode, the traction drive provided with the hydrostatic motor and a hydrostatic pump that is hydraulically connected to the hydrostatic motor, the method comprising:
using a control function, setting a pivot angle of the hydrostatic motor based on a desired velocity of the work machine when in the drive mode;
driving the hydrostatic pump by a drive motor;
checking whether predefined conditions are met; and
when (i) the predefined conditions are met, and (ii) a current velocity differs from the desired velocity, correcting the control function of the hydrostatic motor according to a difference between the desired velocity and the current velocity, the correcting of the control function including learning at least one value of the corrected control function of the hydrostatic motor,
wherein one of the predefined conditions is that a velocity of the drive motor is higher than a predefined velocity that is required for a maximum velocity of the work machine according to a predefined adjustment angle of the hydrostatic motor.

18. The method according to claim 17, wherein the control function of the hydrostatic motor represents an interdependency between a current used for controlling the pivot angle and a volumetric flow of the hydrostatic motor.

19. The method according to claim 18, wherein correcting the control function comprises:
increasing or decreasing the current used for controlling the pivot angle indirectly by correcting the control function until the difference between the desired velocity and the current velocity is less than a predefined value.

20. The method according to claim 18, wherein the control function of the hydrostatic motor includes at least one of a characteristic curve, a formula, and a characteristic map that defines the interdependency between the current used for controlling the pivot angle and the volumetric flow of the hydrostatic motor.

* * * * *